No. 721,934. PATENTED MAR. 3, 1903.
A. L. BUCKLAND.
WEIGHING APPARATUS.
APPLICATION FILED JUNE 20, 1902.
NO MODEL. 2 SHEETS—SHEET 1.

Witnesses,
W. H. Palmer.
Emily Eastman Otis.

Inventor,
Alfred L. Buckland.
by Lothrop & Johnson
his Attorneys.

No. 721,934. PATENTED MAR. 3, 1903.
A. L. BUCKLAND.
WEIGHING APPARATUS.
APPLICATION FILED JUNE 20, 1902.
NO MODEL. 2 SHEETS—SHEET 2.
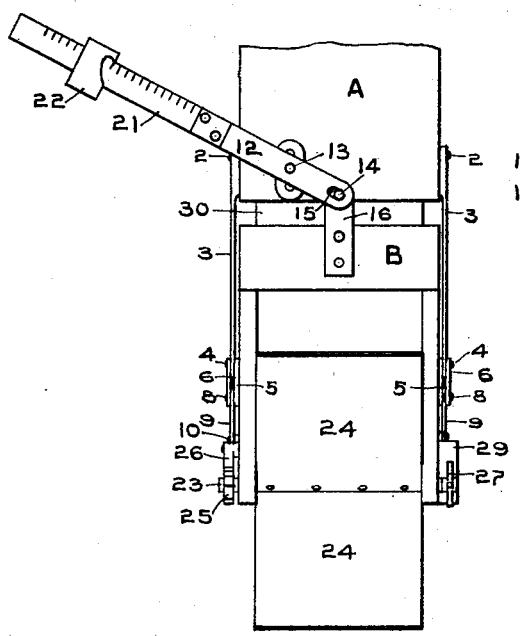
Witnesses,
W. H. Palmer.
Emily Eastman Otis.
Inventor,
Alfred L. Buckland.
by Lothrop & Johnson
his Attorneys.

UNITED STATES PATENT OFFICE.

ALFRED L. BUCKLAND, OF MARIETTA, MINNESOTA.

WEIGHING APPARATUS.

SPECIFICATION forming part of Letters Patent No. 721,934, dated March 3, 1903.

Application filed June 20, 1902. Serial No. 112,405. (No model.)

*To all whom it may concern:*

Be it known that I, ALFRED L. BUCKLAND, a citizen of the United States, residing at Marietta, in the county of Lac qui Parle and State of Minnesota, have invented certain new and useful Improvements in Weighing Apparatus, of which the following is a specification.

My invention relates to improvements in weighing apparatus, its object being to provide an improved apparatus designed particularly for the weighing of grain, and is adapted to be used in connection with the delivery-spout of a grain-elevator or other place where it is desired to weigh grain.

To this end my invention consists in the features of construction and combination hereinafter particularly described and claimed.

Figure 1:
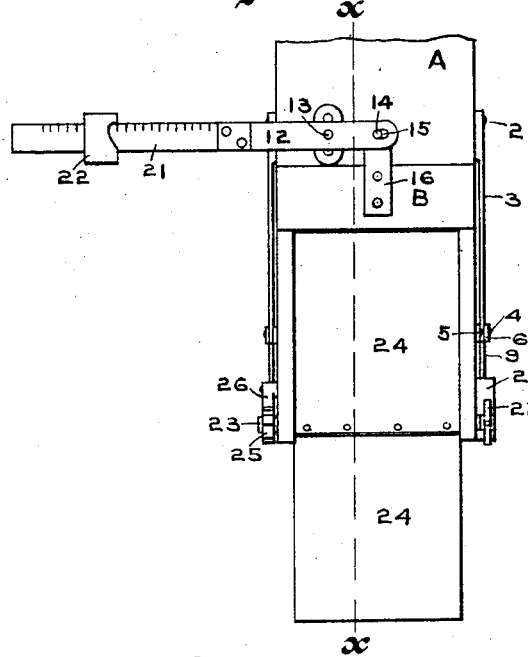
Figure 2:
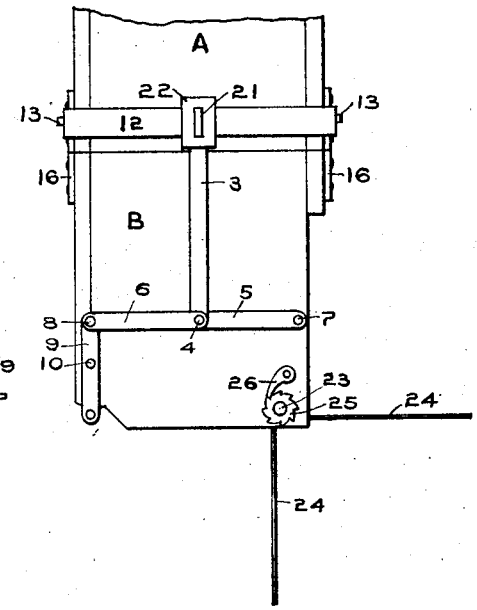
Figure 3:
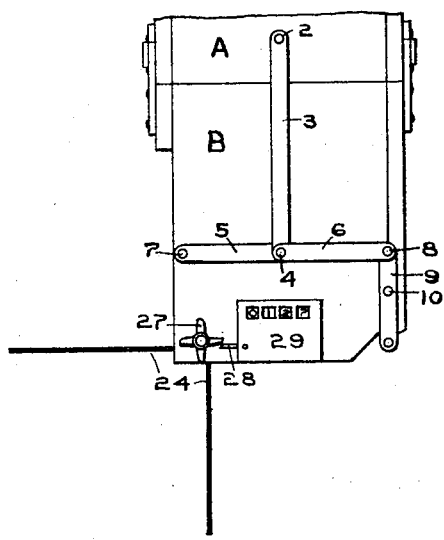
Figure 4:
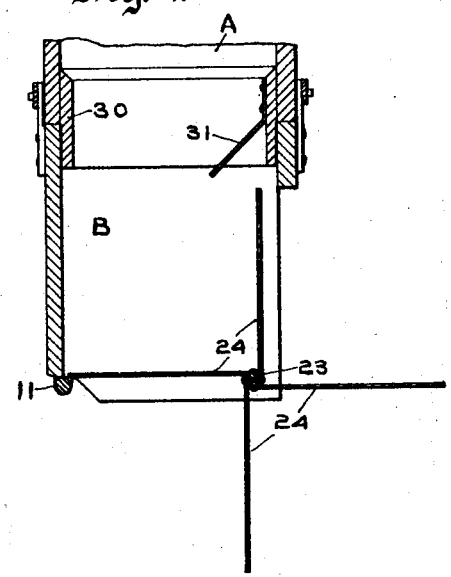

In the accompanying drawings, forming part of this specification, Figure 1 is a front elevation of my improved weighing apparatus. Figs. 2 and 3 are opposite side elevations of the same. Fig. 4 is a section on line $x$ $x$ of Fig. 1. Fig. 5 is a front elevation of my improved apparatus, shown in open position; and Fig. 6 is a side elevation of the same.

In the drawings, A represents a grain-spout, which may, if desired, be the end of the delivery-spout of a grain-elevator. Supported directly below the spout A, in the manner hereinafter described, is a weighing-chamber B. Having pivotal support 2 upon each side of the spout A is a strap 3, said strap extending downwardly and having pivotal connection 4 at its lower ends with the inner ends of horizontal links 5 and 6. The link 5 has pivotal support 7 at its outer end upon one side of the chamber B. The outer end of the link 6 has pivotal connection 8 with a vertical lever 9. The lever 9 has fulcrum-support 10 upon the side of the chamber B, its lower end forming a support for one end of the transverse roller 11.

Upon one side of the spout A is a yoke 12, said yoke having fulcrum-support 13 upon the front and rear of the spout. Each of the inner ends of the yoke has pin-and-slot connections 14 and 15 with a plate 16, secured to the corresponding side of the weighing-chamber B. Projecting outwardly from the yoke 12 is a scale-arm 21, supporting a slidable weight 22.

Mounted in the bottom of the chamber B opposite the roller 11 is a shaft 23, to which are secured the radial wings 24. Upon one end of the shaft 23 is mounted a ratchet 25, with which engages a pawl 26, holding the wings in the positions shown in Fig. 4, with the outer edge of one of said wings resting upon the edge of the roller 11. Upon the opposite end of the shaft 23 is mounted a star-wheel 27, which works in connection with a finger 28 of an indicator 29 of any desired construction.

To prevent the grain passing between the spout and weighing-chamber when the parts are in the position shown in Figs. 5 and 6, I preferably provide a casing 30, secured inside the lower end of the spout and projecting downwardly within the weighing-chamber. I also preferably secure to the forward side of the casing an inwardly-projecting plate 31 to prevent the grain passing over the upwardly-projecting wing.

When the parts are in the position shown in Figs. 1 to 4, two of the wings 24 will constitute the bottom and front of the weighing-chamber. In use the grain passes through the spout A in the weighing-chamber until the weight of the grain within the chamber overbalances the weight 22. The weighing-chamber will then drop into the position shown in Figs. 5 and 6, turning the yoke upon its fulcrum-support and turning the parts 5, 6, and 9, as illustrated in Fig. 6, carrying the roller 11 outward and releasing the adjacent wing 24. The weight of the grain upon the wing 11 will then turn the shaft 23, allowing the grain to pass from the weighing-chamber. As soon as the grain passes from the weighing-chamber the weight 22 will restore the parts to their normal positions. As the grain passes from the chamber B it will turn the shaft 23 sufficiently to bring the next wing into contact with the roller 11 to allow the continued use of the apparatus.

Having now described my invention, what I claim as new, and desire to secure by Letters Patent, is—

1. In an apparatus of the class described, the combination with a spout, of a chamber arranged below said spout, counterbalancing means normally holding said chamber raised, mechanism movably connecting said chamber and spout, wings having rotatable support in said chamber, means actuated from said connecting mechanism to hold one of said wings in horizontal position when the chamber is raised, and to release said wing when the chamber is lowered.

2. In an apparatus of the class described, the combination with a spout, of a chamber arranged below said spout, levers fulcrumed upon said chamber, a toggle-joint connection between said levers and said spout, wings having rotatable support in said chamber, and means carried by said levers normally engaging and supporting one of said wings in horizontal position.

3. In an apparatus of the class described, the combination with a spout, a weighing-chamber arranged below said spout, and a counterbalancing-weight for said chamber, of mechanism movably connecting said chamber and spout, levers connected with said mechanism, wings having rotatable support in said chamber, means carried by said levers normally engaging and supporting one of said wings in horizontal position, said means being actuated by the levers when the chamber is lowered to release said wing.

In testimony whereof I affix my signature in presence of two witnesses.

ALFRED L. BUCKLAND.

Witnesses:
   H. S. JOHNSON,
   EMILY EASTMAN OTIS.